April 1, 1952 F. PELLAR ET AL 2,591,287
CHUCK
Filed June 4, 1949
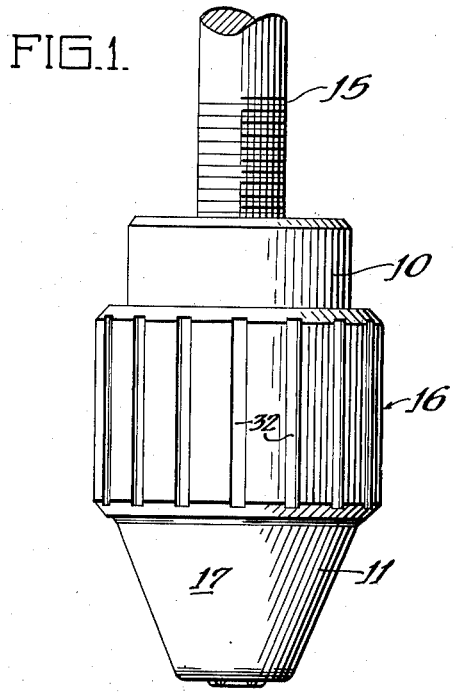
FIG.1.
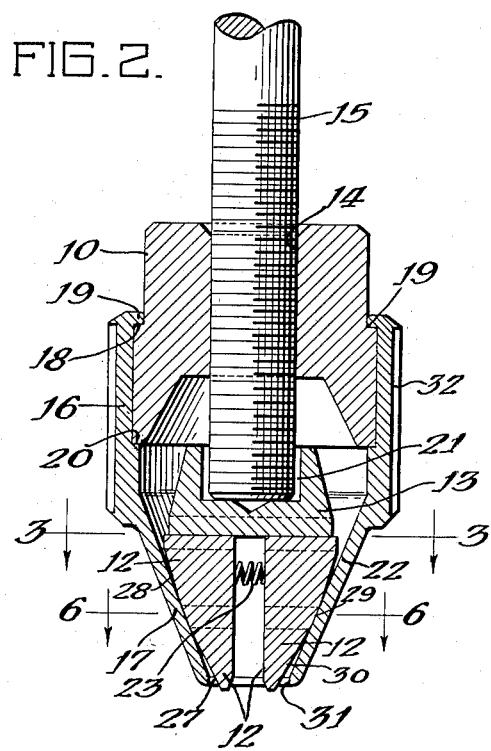
FIG.2.
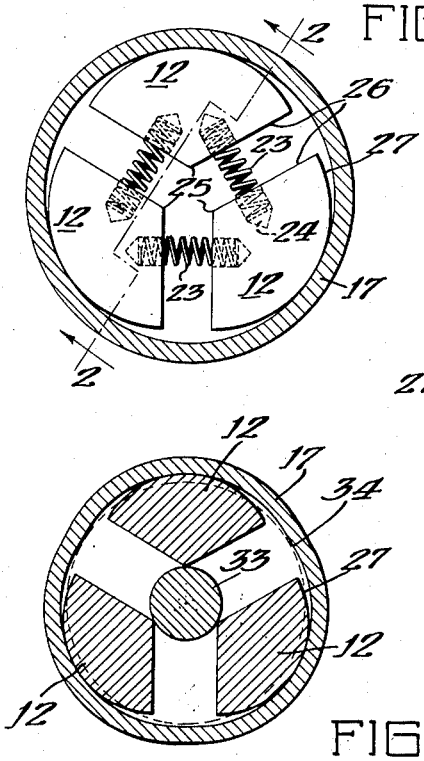
FIG.3.
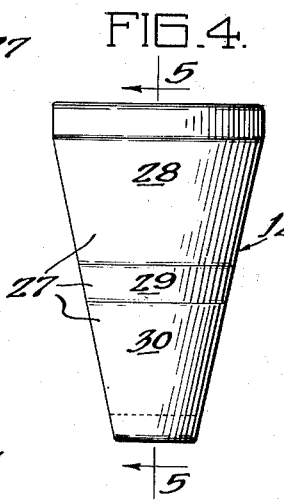
FIG.4.
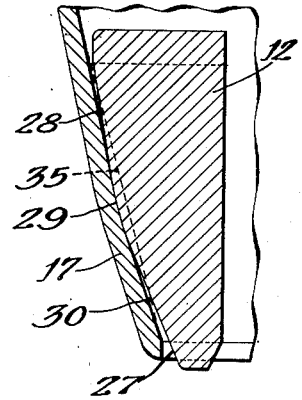
FIG.5.
FIG.6.
Inventors:
Fred Pellar
Joseph C. Zivny
By Zabel & Gritzbaugh
Attorneys Patented Apr. 1, 1952

2,591,287

UNITED STATES PATENT OFFICE 2,591,287

CHUCK

Fred Pellar, Chicago, and Joseph C. Zivny, Berwyn, Ill., assignors to Revere Camera Company, Chicago, Ill., a corporation of Delaware Application June 4, 1949, Serial No. 97,112

9 Claims. (Cl. 279—58)

This invention relates to tool chucks of the tapered shell and jaw type.

It is an object of this invention to provide a chuck which has an improved gripping action, and in particular, one in which the shank of a drill or other tool is gripped firmly without having to wedge the parts.

In a chuck of this type, the tool shank is gripped by a plurality of cooperating jaws disposed in a shell having a tapering wall portion. Means are provided to urge the jaws forwardly against the tapering wall portion, and this causes the jaws to contract into gripping relationship. It has been found in chucks of the prior art, that the torque set up in drilling will often wedge the parts in such a manner that it is very difficult to loosen them when the tool is to be removed. In other instances, the parts will be inadvertently wedged by the operator merely by tightening the chuck in an effort to grip the tool with sufficient force as to avoid slipping. This is particularly true when the chuck is to be tightened or loosened manually as contrasted with a key type chuck.

Another object is to provide a chuck which has an improved self-tightening effect.

It is a further object to provide an improved chuck which eliminates the usual screw threaded connection between certain of the parts, thereby providing an improved concentricity of the jaws with respect to the longitudinal axis of the arbor on which the chuck is mounted.

Other objects, features and advantages will become apparent as the description proceeds.

Fig. 1 is an elevation of a preferred embodiment of our invention;

Fig. 2 is a longitudinal sectional view thereof;

Fig. 3 is a transverse section taken along line 3—3 of Fig. 2;

Fig. 4 is a plan view of one of the jaws;

Fig. 5 is a sectional view taken along line 5—5 of Fig. 4 and also showing a portion of the shell wall, and Fig. 6 is a section taken along line 6—6 of Fig. 2, but showing the parts in gripping position, the deformation of the shell being somewhat exaggerated for purposes of demonstration.

The chuck comprises the body 10, a shell 11, jaws 12, and a plate 13. The body 10 is provided with a threaded bore 14 by means of which the chuck may be mounted on the threaded end of an arbor 15. The arbor may be the arbor of a hand tool or a machine driven tool, and it is driven by suitable means not shown.

The shell comprises a cylindrical portion 16 and a conical portion 17. The exterior of the body 10 or a portion thereof is ground or otherwise formed with a true cylindrical surface which is concentric with the longitudinal axis of the bore 14. The inner surface of the cylindrical portion 16 is similarly formed so that the body and the shell may be associated with each other by a press fit. By eliminating the usual screw threaded connection between the body and the shell, a much higher degree of concentricity is obtained between the conical portion 17 and the jaws which are disposed therein with respect to the longitudinal axis of the bore.

The body 10 is provided with a shoulder 18, and the edge of the cylindrical portion is spun over the shoulder as indicated by the reference numeral 19 so that the parts are locked to each other. An interior shoulder 20, formed in the cylindrical portion 16 serves to positively position the body and the shell with respect to each other.

The plate 13 is disposed between the jaws and the body and is formed with a bore 21 which receives the end of the arbor 15. The downwardly facing surface 22 of the plate is preferably polished to a true plane surface and engages the rear edges of the jaws 12. In this particular embodiment of the invention, three jaws are provided and they are spaced from each other by means of springs 23, the ends of which are received in bores 24 formed in the radially disposed surfaces 26 of the jaws. The intersection of the radial surfaces 26 provides a tool gripping edge 25 on each of the jaws. The jaws are also provided with cam surfaces 27 which engage the inner tapering wall portion of the shell 11.

In operation, the shank of the tool is inserted through the opening in the shell 11 and between the gripping edges 25 of the jaws. Then, as the shell and body are screwed up onto the arbor, the end of the arbor will cause the plate 13 to urge the jaws outwardly, that is, downwardly as shown in Fig. 2, and into engagement with the exterior surface of the conical portion 17. This causes the jaws to contract into gripping relationship with the tool shank.

The improved gripping action is obtained by providing the cam surfaces 27 with a high spot so that the reaction between the cam surfaces and the shell may be localized to such an extent that it will cause a slight deformation of the shell wall. This provides a "loading" or a resilient gripping action which has been found to facilitate greatly the tightening and loosening of the chuck, The high spot is obtained by crowning the cam surfaces 27 in the longitudinal direction.

A preferred method of crowning is shown in Figs. 4 and 5, in which the cam surface is shown as comprising three portions, an inner portion 28, a middle portion 29, and an outer portion 30. Each of these portions is a conical surface, the taper of the middle portion 29 being substantially the same as the taper of the interior surface of the conical portion 17. The taper of the inner portion 28 is less than the taper of the middle portion 29 and the taper of the outer portion 30 is greater than the taper of the middle portion. Thus, in normal position, the inner and outer portions do not contact the conical portion, and all of the force exerted by the jaws against the cylindrical portion of the shell is localized at those points which are engaged by the middle portion.

As shown in Fig. 3, the radius of the cam surfaces is somewhat less than the radius of the conical portion at corresponding points along the longitudinal axis. Thus, the cam surfaces are crowned laterally as well as longitudinally.

This loading action is diagrammatically illustrated in Figs. 5 and 6 in which the longitudinal and lateral deformation of the shell is indicated by reference to lines 35 and 34 respectively. The deformation is somewhat exaggerated in each instance for the purpose of illustration. Line 35 in Fig. 5 indicates the undeformed interior surface and is indicated by dotted lines 35 and 34 in each instance. As shown in Fig. 6 the deformation occurs when a tool shank 33 is gripped by the jaws. Due to the fact that the high spot is in the middle of each jaw, the shell can be deformed in a longitudinal direction as well as in a lateral direction, and in particular, the deforming pressure is localized at a point comparatively remote from the opening 31 at the end of the shell.

To facilitate the tightening and loosening of the chuck, the cylindrical portion 16 of the shell is provided with slots 32 which afford a hand grip. It has been found that the present construction provides a definite self-tightening action. That is, even though the chuck is not screwed up tightly on the arbor, the drag on the drill will cause a relative rotation between the arbor and the chuck which will tighten the grip on the drill or other tool. This is believed to be due primarily to the loading effect referred to above.

In a chuck of a quarter inch capacity, it has been found that the thickness of the wall of the tapering portion 17 may be approximately one-sixteenth of an inch. This is considerably less than the wall thickness of prior art chucks of the same capacity or size. The shell 11 may be a screw machine product formed from bar stock steel.

Although only a preferred embodiment of our invention has been shown and described herein, it will be understood that various modifications and changes may be made in the construction shown without departing from the spirit of the invention as defined in the appended claims.

We claim:

1. A chuck comprising a body portion having a threaded bore for receiving an arbor on which said chuck is mounted, said body portion having a cylindrical surface concentric with the axis of said bore, a shell having a tapered resilient wall portion and a cylindrical portion, said cylindrical portion being fitted onto the cylindrical surface of said body portion, a set of jaws disposed within said shell and having cam surfaces adapted to engage said tapered wall portion, said cam surfaces being longitudinally crowned, and means to urge each of said jaws against said tapered wall portion and into gripping engagement with the shank of a tool.

2. A chuck comprising a body portion having a threaded bore for receiving an arbor on which said chuck is mounted, a shell secured to said body by means of a press fit and having a tapered resilient wall portion, a set of jaws disposed within said shell and having gripping edges parallel to the axis of said chuck and having cam surfaces adapted to engage said tapered wall portion, and a plate disposed between the rear edges of said jaws and said body and adapted to be engaged by an arbor to urge each said jaws against said tapered wall portion and into gripping engagement with the shank of a tool.

3. A chuck comprising a body portion having a threaded bore for receiving an arbor on which said chuck is mounted, a shell secured to said body by means of a press fit and having a tapered resilient wall portion, a set of jaws disposed within said shell and having gripping edges parallel to the axis of said chuck and having cam surfaces adapted to engage said tapered wall portion, said cam surfaces being laterally and longitudinally crowned, and a plate disposed between the rear edges of said jaws and said body and adapted to be engaged by an arbor to urge each said jaws against said tapered wall portion and into gripping engagement with the shank of a tool.

4. A chuck comprising a body portion having a threaded bore for receiving an arbor on which said chuck is mounted, said body portion having a cylindrical surface concentric with the axis of said bore, a shell having a tapered resilient wall portion and a cylindrical portion, said cylindrical portion being mounted on the cylindrical surface of said body by means of a press fit, a set of jaws disposed within said shell and having gripping edges parallel to the axis of said chuck and having cam surfaces adapted to engage said tapered wall portion, and a plate disposed between the rear edges of said jaws and said body and adapted to be engaged by an arbor to urge each said jaws against said tapered wall portion and into gripping engagement with the shank of a tool.

5. A chuck according to claim 4 in which said body portion is provided with a shoulder and in which the cylindrical portion of said shell extends beyond said shoulder and is spun over the same.

6. In a chuck, the combination of a shell having a tapered resilient wall portion providing a conical interior surface, a plurality of jaws having cam surfaces for engaging said wall portion, the middle portion of said cam surface constituting a conical surface having substantially the same degree of taper as the conical surface of said tapered wall portion, and the remaining portions of said cam surface being normally out of contact with said tapered wall portion whereby the pressure exerted by said jaws on said tapered wall portion will be localized in order to cause deformation of said tapered wall portion.

7. In a chuck, the combination of a shell having a resilient tapered wall portion providing a conical interior surface, a plurality of jaws having cam surfaces for engaging said wall portion, the middle portion of said cam surface constituting a conical surface having substantially the same degree of taper as the conical surface of said tapered wall portion, and the remaining portions of said cam surface constituting conical surfaces which are normally out of contact with said tapered wall portion whereby the pressure exerted by said jaws on said tapered wall portion will be localized in order to cause deformation of said tapered wall portion.

8. In a chuck, the combination of a shell having a tapered resilient wall portion providing a conical interior surface, a plurality of jaws having cam surfaces for engaging said wall portion, at least a portion of each of said cam surfaces constituting a conical surface of less radius than the radius of that part of said conical interior surface which is opposite said portion when the parts are in operative relationship, and having substantially the same degree of taper as said conical interior surface, and the remaining portions of said cam surfaces being normally out of contact with said tapered wall portion whereby the pressure exerted by said jaws on said tapered wall portion will be localized in order to cause deformation of said tapered wall portion.

9. In a chuck of the tapered shell and jaw type, the combination of a shell having a resilient conical wall portion providing a conical interior surface, a jaw having a cam surface for cooperation with said conical interior surface provided with inner, middle and outer portions, all of said portions being conical surfaces, the taper of said middle portion being substantially the same as the taper of said conical interior surface, and being greater than the taper of said inner portion and less than the taper of said outer portion.

FRED PELLAR.
JOSEPH C. ZIVNY.

REFERENCES CITED

The following references are of record in the file of this patent:

UNITED STATES PATENTS

| Number | Name | Date |
| --- | --- | --- |
| 482,616 | Buck | Sept. 13, 1892 |
| 594,587 | Almond | Nov. 30, 1897 |
| 2,413,422 | Teige et al. | Dec. 31, 1946 |
| 2,433,198 | Carlson | Dec. 23, 1947 |